United States Patent [19]

Miura et al.

[11] Patent Number: 5,087,058
[45] Date of Patent: Feb. 11, 1992

[54] METAL GASKET FOR MANIFOLD

[75] Inventors: Masahiko Miura, Kawachinagano; Shigeru Kawaguchi, Daito; Kunitoshi Inoue, Higashiosaka; Hideo Yamamoto, Miura; Ken Ohkura, Yokohama, all of Japan

[73] Assignee: Nippon Gasket Co., Ltd., Osaka, Japan

[21] Appl. No.: 708,574

[22] Filed: May 31, 1991

[30] Foreign Application Priority Data

Aug. 13, 1990 [JP] Japan .................................. 2-211692

[51] Int. Cl.$^5$ .......................... F16J 15/12; F02F 11/00
[52] U.S. Cl. .................................. 277/235 B; 277/236; 277/233; 277/231; 277/232
[58] Field of Search ............... 277/235 B, 236, 235 R, 277/233, 234, 231, 232; 123/193 H, 193 CH

[56] References Cited

U.S. PATENT DOCUMENTS

| 1,721,326 | 7/1929 | Wilson | 277/236 |
| 4,056,682 | 11/1977 | Havens et al. | 277/236 X |
| 4,915,398 | 4/1990 | Kitagawa | 277/236 X |
| 4,948,153 | 8/1990 | Takahashi et al. | 277/236 X |

FOREIGN PATENT DOCUMENTS

| 0261755 | 11/1987 | Japan | 277/235 R |
| 0104953 | 4/1989 | Japan | 277/235 B |
| 0300043 | 12/1989 | Japan | 277/236 |
| 2-61169 | 5/1990 | Japan . | |
| 2-61170 | 5/1990 | Japan . | |

Primary Examiner—William A. Cuchlinski, Jr.
Assistant Examiner—J. Folker
Attorney, Agent, or Firm—Browdy and Neimark

[57] ABSTRACT

Disclosed is a metal gasket for a manifold produced by laminating a plurality of bead plates having bead portions which are bent at a predetermined radius of curvature R and by setting the ratio R/t of the radius of curvature R to the thickness t of the bead plates to the range of 7 to 15. Therefore, the radius of curvature of the bent portions of the bead plates to the thickness can be made relatively great and the bent portions of the bead plates become smooth. As a result, when the metal gasket is tightened between a cylinder head and an exhaust manifold, the contact portions of the bead plates are expanded and the stress and face-to-face pressure occurring at the contact portions can be reduced. Accordingly, the stress acting on the bead plates can be made lower than a reference value, the increase of the facet-face pressure can be restricted to within a predetermined range and the stress and face-to-face pressure of the bead portions forming a seal surface can be kept within suitable ranges. For these reasons, even if great thermal deformation occurs in the exhaust manifold relative to the cylinder head, seal performance of the metal gasket is not lowered.

8 Claims, 3 Drawing Sheets

METAL GASKET FOR MANIFOLD

BACKGROUND OF THE INVENTION

1. Field of the Invention

This invention relates to a metal gasket for a manifold which is tightened under a clamped state between the end surface of an exhaust manifold and a cylinder head having open exhaust ports.

2. Description of the Prior Art

Conventionally, a metal gasket for an exhaust manifold of an engine which is clamped between the end surface of an exhaust manifold and the side surface of a cylinder head having open exhaust ports and tightened by fastening bolts or the like is disposed lest an exhaust gas leaks from the contact surface between the cylinder head and the exhaust manifold and various types of gaskets for a manifold have been employed.

A typical metal gasket for a manifold is of a type consisting of the laminate of metal plates. This metal gasket is produced generally by laminating three to five metal plates. In a metal plate laminate gasket having an odd-numbered metal plates such as a three-layered metal plate laminate gasket, for example, the metal plate at the center is composed of a flat steel sheet not having any bead and the metal plates on both sides are bead plates having a projection form so that their bead portions are spaced apart progressively from each other. Such a metal gasket is disclosed, for example, in Japanese Utility Model Laid-Open No. 61169/1990 and Japanese Utility Model Laid-Open No. 61170/1990.

In the case of an even-numbered laminate metal gasket such as a four-layered metal gasket, a structure wherein two bead plates having a projection form so that their bead portions are spaced apart progressively from each other are laminated and two of the resulting laminates are superposed one upon another can be employed.

In the case of a laminate gasket consisting of five metal plates, a flat metal plate not having a bead portion is sandwiched at the center of the four metal plates.

In the metal gaskets having the structure described above, the metal plate having the bead portion is shaped in such a manner that its bead is curved at and rises from the flat plate portion under a free state, then inclines slantwise, is bent in an opposite direction and extends once again in parallel with the flat plate portion.

The metal gasket of the type described above wherein a predetermined number of thin metal plates are laminated has high flexibility and high heat-resistance and exhibits suitable compressibility when a bead structure is provided thereto. When the metal gasket equipped with the bead plates having such bead portions is clamped and tightened between the joint surface of the cylinder head and the exhaust manifold by fastening bolts, or the like, the bead portions define a loop-like seal surface to the contact surfaces of the cylinder head and the exhaust manifold and prevents effectively an exhaust gas from leaking from such opposed surfaces.

Such a metal gasket is economical and is less likely to undergo degradation of its seal performance. When used as a gasket for an exhaust manifold which is exposed to high temperatures and whose coefficient of thermal expansion increases, the metal gasket is extremely advantageous from the aspect of seal performance.

Contrary to the advantage described above, however, the conventional metal gasket is not free from the following drawbacks. In other words, as higher and higher performance of engines such as compactness in size, reduction of weight and higher output has been required in recent years, a cylinder head is made of an aluminum alloy to reduce the size and weight and to reduce the thickness of an exhaust manifold and the temperature of an exhaust gas is raised to a higher temperature as one of the means for accomplishing higher engine performance. If the cylinder head is made of an aluminum alloy, thermal expansion or thermal shrinkage of the cylinder head increases due to the temperature change with an engine operation and if the thickness of the exhaust manifold is reduced, the quantity of thermal deformation of a gasket fitting surface or in other words, a flange portion, increases. If the exhaust gas temperature is raised to a higher temperature, thermal deformation of the exhaust manifold is further promoted by its temperature rise.

These conditions become severe for the metal gasket when a thermal stress and a mechanical stress are taken into consideration and the critical limit at which the metal gasket can follow the opposed surfaces of the cylinder head and the exhaust manifold where thermal deformation becomes great must be pursued.

With the background described above, severer requirements for a high temperature gasket have been imposed on the metal gasket for a manifold.

If a stainless steel sheet is used for the metal gasket, therefore, the material itself has high durability inclusive of heat-resistance but when exposed to thermal fluctuations having a large width of temperature change, it is not free from the following problems. Namely, the temperature difference between the cylinder head and the exhaust manifold changes remarkably in accordance with various operating conditions of the engine inclusive of the stop of the engine and the difference in thermal expansion between the cylinder head and the exhaust manifold, that is, the relative displacement distance, increases and invites permanent strain where the height of a residual bead at the bead portions of the metal gasket decreases or cracks of the bead portions resulting from the repetition of stress on the metal gasket. All of them result eventually in degradation of seal performance such as the leak of the exhaust gas.

SUMMARY OF THE INVENTION

It is an object of the present invention to solve the problems described above, to provide a metal gasket for a manifold having a highly reliable seal structure which has a small degree of permanent strain at bead portions formed on metal bead plates and is less likely to invite the occurrence of cracks even used under severe thermal stress conditions when an exhaust gas temperature is high, and to provide a metal gasket for a manifold comprising bead plates equipped with bead portions which can solve the above problems with existing metal gaskets of a laminate structure of metal plates, by providing a bead shape such that the relation between the thickness t of the metal bead plates and the bending radius or the radius of curvature R, that is, the ratio R/t is set to an optimal value of 7 to 15.

In a metal gasket for a manifold disposed between a cylinder head equipped with exhaust ports and an exhaust manifold fixed to the cylinder head and equipped with inlets in alignment with the exhaust ports, it is another object of the present invention to provide a metal gasket for a manifold which is characterized in that the metal gasket includes a plurality of metal bead plates having holes formed and positioned in such a manner as to correspond to the exhaust ports of the cylinder head; the bead plates have flat portions each having a flat surface, taper portions whose boundary portions with the flat portions are bent at a predetermined radius of curvature R and which extend in directions spaced apart from the other of the bead plates and bead portions whose boundary portions with the taper portions are bent at a predetermined radius of curvature R, extend in parallel and in the spaced-apart relation with the other bead plate and are positioned around the holes in the bead plates; and the ratio R/t of the radius of curvature R to the thickness t of the bead plates is set to within the range of 7 to 15.

In the metal gasket for a manifold described above, the thickness of the bead plates is set to within the range of 0.2~0.35 mm.

The metal gasket for a manifold in accordance with the present invention is clamped between the end surface of a flange of an exhaust manifold and the side surface of a cylinder head having exhaust ports opening therefrom and consists of a thin metal plate of a laminate structure formed by laminating at least two flat plates or bead plates having bead portions under an unfixed state and the ratio R/t of the radius of curvature R of the bead portions to the thickness t of the bead plates is set to 7 to 15. Accordingly, when the stress and face-to-face pressure occurring at the bead portions are analyzed by a finite element method with the radius of curvature R being 0.5 mm as a reference, the stress can be reduced to below the reference value whereas an increase in face-to-face pressure from a reference value can be restricted to within a predetermined range.

This means that the radius of curvature of the bent portions existing on both sides of each taper portion can be made relatively great with respect to the plate thickness for each bead plate. Furthermore, since the rise from the flat portions to the taper portions of the bead plates becomes smooth and the shift from the taper portions to the bead portions becomes smooth, too, so that the contact surfaces of the bead plates become broader due to such smooth shift portions when the metal gasket is tightened between the opposed surfaces of the cylinder head and the exhaust manifold and the stress occurring at the contact portions and the face-to-face pressure can be reduced.

In the conventional metal gaskets, the bead portions are affected by the cylinder head and the exhaust manifold that are exposed to thermal changes having great temperature ranges and as a result are likely to develop permanent strain and cracks to invite the drop of seal performance whereas the metal gasket for a manifold in accordance with the present invention can make the stress lower than a reference value and limit an increase in face-to-face pressure from a reference value to within a specified range, and can restrict the stress and face-to-face pressure of the bead portions forming the seal lines of linear contact to within suitable ranges and consequently, can prevent degradation of seal performance due to a thermal change having a great temperature range.

In accordance with the metal gasket for a manifold of the present invention, the middle plate can be constituted by two bead plates whose bead portions are brought into mutual contact. Therefore, the face-to-face pressure around gas passage holes can be further increased, seal performance of the metal layer gasket can be further improved and the leak of the exhaust gas from the gasket between the cylinder head and the exhaust manifold can be prevented further.

Furthermore, the metal gasket for a manifold in accordance with the present invention can be produced in diversified ways while keeping the same laminate structure as that of the conventional metal gaskets by the combination of different plate thicknesses and the radii of curvature of the bead portions and a suitable gasket can be selected from among them in accordance with the kind of the engine to be employed. In other words, the adjustment of the stress occurring at the bead portions when the exhaust manifold is fastened to the cylinder head by bolts and the adjustment of the tightening face-to-face pressure at the bead portions to the exhaust manifold and to the cylinder head can be made by merely replacing such gaskets and are therefore by far easier than the conventional adjustment of dimension and others required by the change of the production process of the bead portions.

DETAILED DESCRIPTION OF THE EMBODIMENTS

Hereinafter, preferred embodiments of the metal gasket for a manifold in accordance with the present invention will be described with reference to the accompanying drawings.

Figure 1:
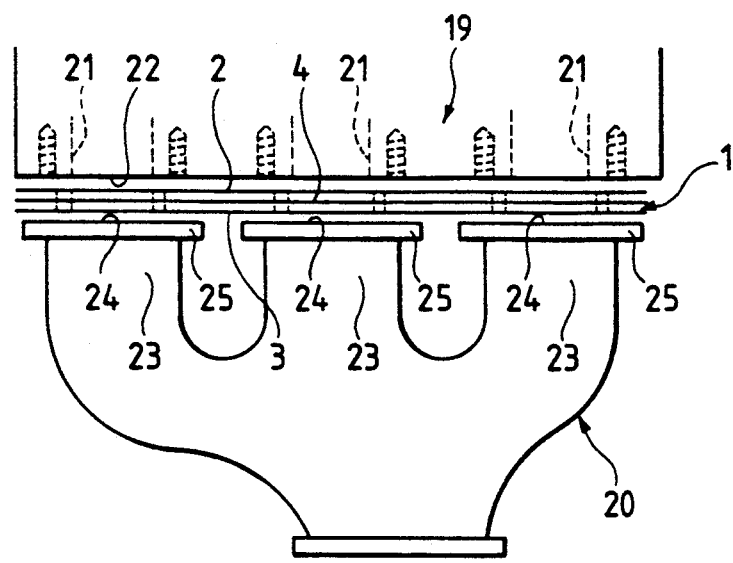
FIG. 1 is a schematic explanatory view showing a state where a metal gasket for a manifold in accordance with the present invention is disposed between a cylinder head and an exhaust manifold, but is not yet tightened.

In FIG. 1 (which shows only one side of a V-type 6-cylinder engine as an example of a multi-cylinder engine) there are shown disposed a cylinder head 19 having exhaust ports 21 opening therefrom, an exhaust manifold 20 fixed to the cylinder head 19 and having as many inlet manifold pipes 23 as the number of the exhaust ports 21 and a metal gasket 1 for a manifold disposed between the cylinder head 19 and the exhaust manifold 20 under the state before they are mutually fastened.

Figure 2:
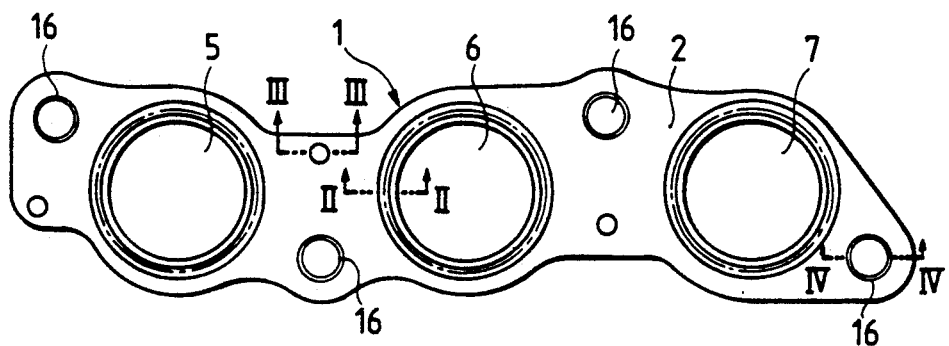
FIG. 2 is a plan view showing the metal gasket for a manifold in accordance with the present invention as a whole.

An example of the metal gasket for a manifold in accordance with the present invention is shown in FIG. 2. It is clamped, fastened and fixed between the side surface 22 of the cylinder head 19 and the end surface 24 of a flange 25 of the exhaust manifold 20. As shown in this drawing, the metal gasket 1 is employed in order to keep air-tightness between the opposed side surface 22 of the cylinder head 19 and end surface 24 of the exhaust manifold 20 around the three exhaust ports 21 shown in the drawing, for example, and to prevent an exhaust gas from leaking from between the cylinder head 19 and the exhaust manifold 20.

Figure 3:
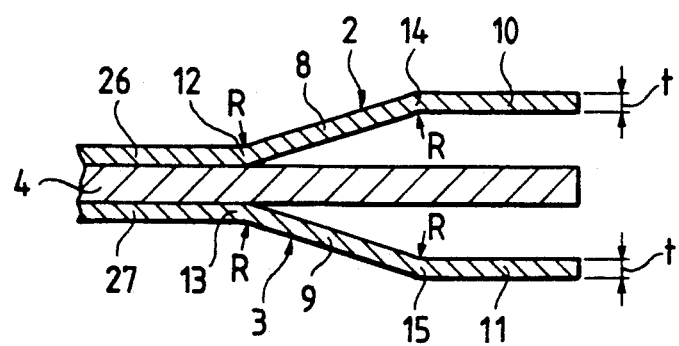
FIG. 3 is a sectional view showing an embodiment of the metal gasket for a manifold in accordance with the present invention and taken along line II—II of FIG. 2.
Figure 4:
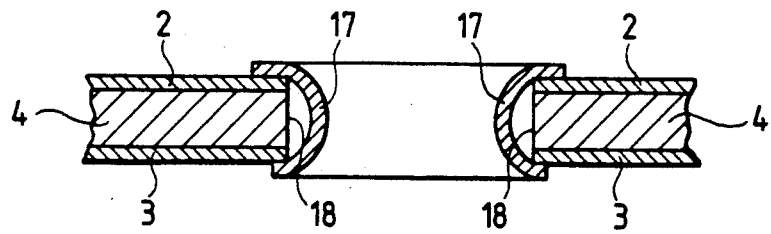
FIG. 4 is a sectional view showing the metal gasket of FIG. 3 and taken along line III—III of FIG. 2.
Figure 5:
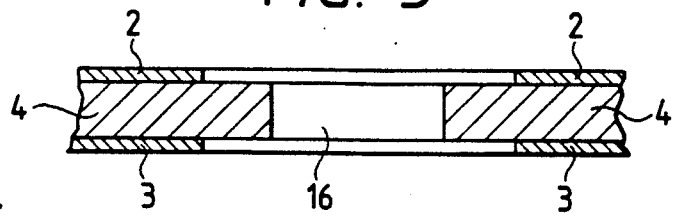
FIG. 5 is a sectional view showing the metal gasket of FIG. 3 and taken along line IV—IV of FIG. 2.

The metal gasket 1 comprises a pair of bead plates 2, 3 and a metal middle plate 4 disposed between these bead plates 2, 3 as shown in FIG. 3. The pair of bead plates 2, 3 and the middle plate 4 have the same number of gas passage holes 5, 6 and 7 as the number of exhaust ports 21 bored in the cylinder head 19 of the multicylinder engine. These gas passage holes 5, 6 and 7 are formed when first holes bored in the bead plates 2, 3 and second holes bored in the middle plate 4 are in alignment with one another.

The pair of bead plates 2, 3 have flat portions 26, 27 each having a flat surface which comes into contact with the middle plate 4, taper portions 8, 9 which are bent at the boundary portions between them and the flat portions 26, 27 and are progressively spaced apart from the middle plate 4 as they extend towards the gap passage holes 5, 6 and 7 under the free state before fastening and bead portions 10, 11 which are bent at the boundary portion between them and the taper portions 8, 9, extend in parallel while being spaced apart from the middle plate 4 and are positioned around the gas passage holes 5, 6, 7 formed in the bead plates 2, 3, as shown in FIG. 3. The spaced-apart portions or in other words, the boundary portions where the main flat portions 26, 27 of the bead plates 2, 3 shift to the taper portions 8, 9 and the boundary portions where the taper portions 8, 9 shift to the bead portions 11, 12 which are in parallel with the middle plate 4, are bent in advance with a predetermined radius of curvature R to form bent portions. The bead portions 10, 11 are formed in a state where they have a spring function or elastically deformable in order to absorb deformation such as great thermal deformation at the fitting flange of the exhaust manifold. The bead plates 2, 3 and the middle plate 4 are laminated under the mutually unfixed state near the flat portions 26, 27 around the taper portions 8, 9 of the bead plates 2, 3.

Since the bead plates 2, 3 are formed and disposed in the manner described above, the metal gasket 1 for a manifold can keep air-tightness between the opposed surfaces consisting of the end surface of the cylinder head and the end surface of the exhaust manifold and can exhibit an extremely excellent seal function.

The middle plate 4 is produced from a molten aluminum-plated steel sheet (SAIC, SACC) which is from 0.3 to 0.7 mm thick and preferably 0.5 mm thick. The thickness t of the bead plates 2, 3 as the thin metal sheet on both sides is produced from a 0.2 to 0.35 mm-thick stainless steel refined sheet (SUS 301H, etc; 0.25 mm thick in this embodiment). The diameter of the gas passage holes 5 to 7 is 40 mm. The width of the taper portions 8, 9 of the bead plates 2, 3 (the width viewed in the radial direction of the gas passage holes) is 2.5 mm and the width of the bead portions 10, 11 (in the same direction as above) is 2.75 mm. Further, the height of the bead portions 10, 11 from the middle plate 4 is 0.75 mm. In other words, the height of the metal gasket 1 under the free state is set to be 1 mm including the thickness t of the bead plates 2, 3.

The bent portions 12, 13 of the bead plates 2, 3 shifting from their main flat portions to their taper portions 8, 9 and the bent portions 4, 15 shifting from the taper portions 8, 9 to the bead portions 10, 11 are subjected to bend-machining with a radius of curvature R of at least 0.5 mm.

In the drawing, reference numeral 16 represents a plurality of fitting holes that are disposed dispersedly in each of the bead plates 2, 3 and the middle plate 4 in such a manner as to be distributed uniformly throughout the metal gasket 1. The metal gasket 1 is clamped and fitted between the cylinder head side surface and the manifold end surface by fixing a fixing member such as a bolt to each hole disposed in the same position of the exhaust manifold and the cylinder head.

Reference numeral 17 represents a fixing eyelet for fixing the middle plate 4 and the bead plates 2, 3 on both sides of the former. These middle plate 4 and bead plates 2, 3 are fitted to the common hole 18 bored at the same position. After being fitted into the hole 18, the fixing eyelet 17 is bent back to the surface side of the bead plates 2, 3 on both sides so as to fix them to the middle plate 4. The fixing eyelet 17 is disposed at an alternate position relative to the hole 16 in such a manner as to be capable of securing a uniformly distributed integrity of the metal gasket 1 as a whole.

When the cylinder head 1 and the exhaust manifold 2 are fastened after the fixing member such as a bolt is fitted into the fitting hole 16, the bead portions 10, 11 of the bead plates 2, 3 on both sides of the metal gasket 1 clamped between them come into contact with the opposed surfaces of the cylinder head and the exhaust manifold, form linear contact seal lines and can prevent the leak of a combustion gas at the peripheries of the gas passage holes 5 to 7.

The exhaust manifold is produced from a heat-resistant steel or stainless steel and the material thickness is reduced as much as possible at the time of production, so that its thermal deformation relative to the cylinder head due to the temperature change is great. However, since the metal gasket 1 is constituted as described above, the stress and face-to-face pressure of the contact portion of the metal gasket 1 forming the seal line fall within preferable ranges and its permanent strain is sometimes less than one-half that of the conventional metal gasket.

Next, the functions of the metal gasket for a manifold in accordance with the present invention will be explained specifically with referent to FIGS. 9 and 10.

Figure 9:
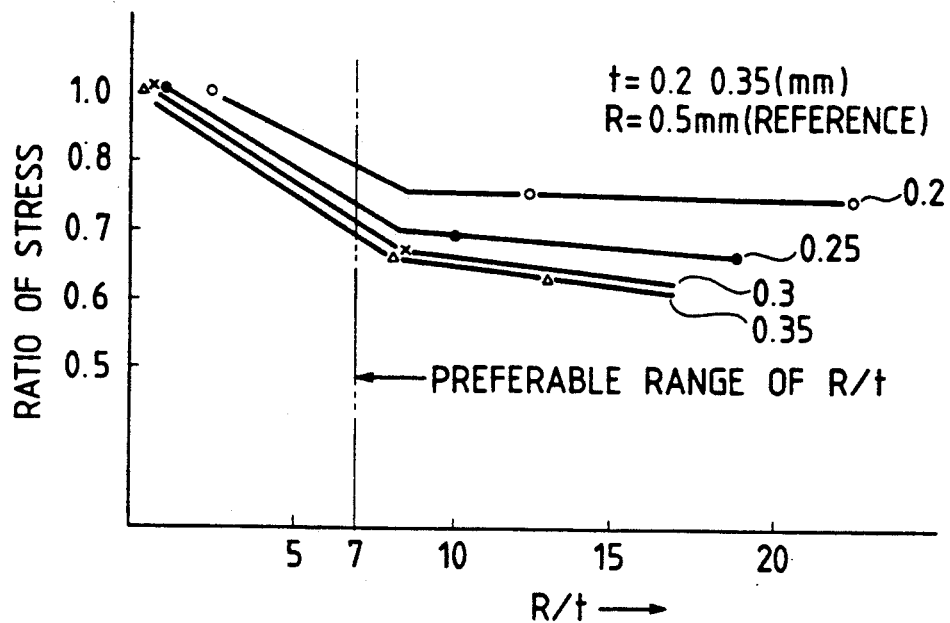
FIG. 9 is a diagram showing the ratio of the stress occurring at the contact portion of bead plates to a reference stress.

In FIG. 9, a ratio R/t of the radius of curvature R of the bent portion to the thickness t of the bead portion (dimensionless quantity) is plotted on the abscissa and the ratio of the stress occurring at the contact portion of the bead plate with the cylinder head or the exhaust manifold to the stress occurring at the contact portion when the bending radius R is 0.5 mm as being a reference (dimensionless quantity) or in other words, the ratio of stress, is plotted on the ordinate with the plate thickness t being a parameter. Here, the term "stress at the bead portion" means the bending stress that occurs at the bend-machining portion of the bead portion of the metal gasket when the bead portion is clamped and fastened between the bond surfaces of the cylinder head and exhaust manifold. The compressive stress occurs on the convex surface side of the bend-machining portion under its free state and the tensile stress occurs on the concave surface side. Each of these stresses reaches the greatest value on the surface of the concave-convex surface and its maximum stress will be referred to as the "stress of the bead portion".

The diagram shows in FIG. 9 represents the result of numeric analysis in accordance with a finite element method. The radius of curvature R of the bent portion is set to 0.5 mm because it is the value which has been employed conventionally and the thickness t of the bead plate is limited to within the range of 0.2 to 0.35 mm because the thickness of the bead plate which can be employed practically falls within this range.

As can be read from FIG. 9, the ratio of stress of the contact portion exists near 1.0 if the radius of curvature R of the bent portion is small as in the conventional metal gasket or in other words, if the shift from the flat portions is made abruptly at both ends of the taper portions whichever value the plate thickness may be within the range described above but as the radius of curvature R becomes greater and greater, the characteristic curve slants down to the right in the diagram or the ratio of stress at the contact portion drops drastically from 1.0. The ratio of stress drops to 35% when R/t is about 7 and tends to extend horizontally or slightly downward when R/t is greater than 7. When the change with respect to the plate thickness t as the parameter is considered, it can be understood that the drop of the ratio of stress becomes greater with an increasing plate thickness t.

It can be understood from the description given above that the range of R/t that can be employed is at least 7 because a range where the ratio of stress drops sufficiently is undoubtedly preferred.

Figure 10:
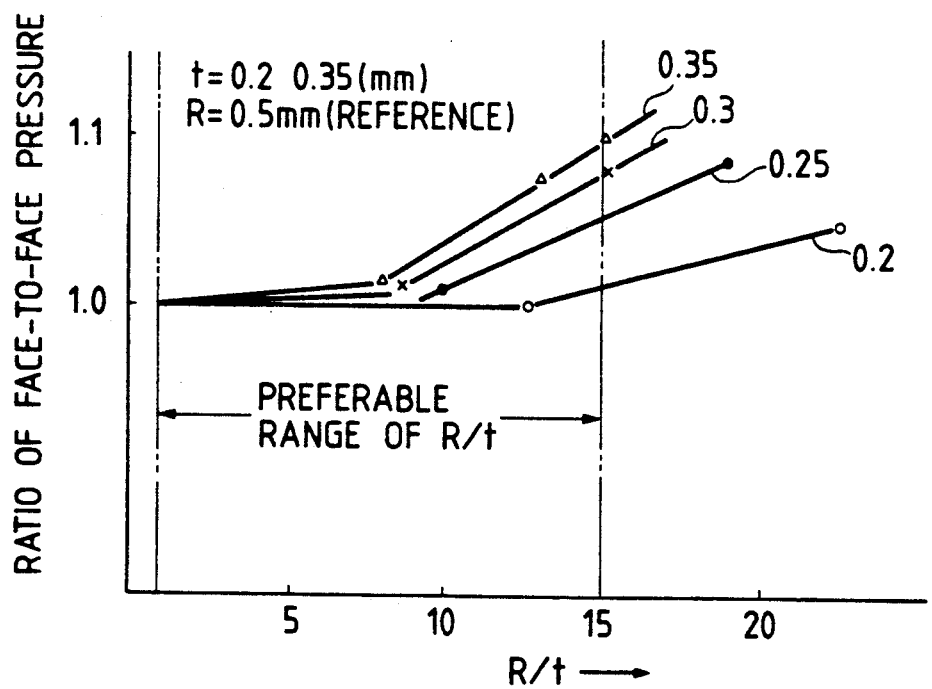
FIG. 10 is a diagram showing the ratio of the face-to-face pressure occurring at the contact portion of the bead plates to a reference face-to-face pressure.

In FIG. 10, the ratio R/t (dimensionless quantity) of the radius of curvature R of the bent portion to the thickness t of the bead plate is plotted on the abscissa and the ratio of face-to-face pressure (dimensionless quantity) occurring at the contact portion of the bead plate with the cylinder head or the manifold to the face-to-face pressure occurring at the contact portion when the radius of curvature R is 0.5 mm as a reference is plotted on the ordinate with the plate thickness t being a parameter. Here, the term "face-to-face pressure of the bead portion" means the clamping pressure occurring at the bent portion of the bead portion of the metal gasket when the bead plate is clamped and fastened between the cylinder head and the exhaust manifold. This diagram is obtained by numeric analysis in accordance with the finite element method and other conditions are the same as those of FIG. 9. Therefore, repetition of explanation of the overlap portions will be omitted.

As can be read from FIG. 10, the ratio of face-to-face pressure of the contact portion exists near 1.0 if the radius of curvature R of the bent portion is small as in the conventional metal gasket or in other words, if the shift from the flat portions is made abruptly at both ends of the taper portions, whichever value the plate thickness may be within the range described above. However, the characteristic curve rises to the right with an increasing radius curvature R of the bent portion or the ratio of face-to-face pressure of the contact portion increases gradually from 1.0 and when the plate thickness t is 0.35 mm, R/t starts increasing from about 8 and when R/t is 15, the ratio of face-to-face pressure exceeds 1.1. When the change with respect to the thickness t as the parameter is observed, the increase of the ratio of face-to-face pressure becomes greater with an increasing thickness t.

It can be understood from the explanation given above that the range of R/t that can be employed is up to 15 because a preferred range of the ratio of face-to-face pressure does not exceed 1.1.

In the metal gasket for a manifold in accordance with the present invention, therefore, the range of R/t is preferably within the range of 7 to 15 when both the ratio of stress and ratio of face-to-face pressure described above are taken into consideration.

From the production aspect the linear portion of each taper portion becomes too short if the radius of curvature R of the bent portion is excessively great, so that a maximum value of the radius of curvature that can be employed is preferably 3.5 mm.

Accordingly, the upper limit value of R/t assumes the smallest value when the plate thickness t is the greatest value, that is, 0.35 mm; hence, $3.5/0.35 = 10$.

The metal gasket for a manifold in accordance with the present invention can provide a metal gasket having excellent sealability, free from the occurrence of permanent strain or cracks and having high reliability when the ratio R/t of the radius of curvature R of the bent portion to the thickness t is within the range of 7 to 15 in consideration of the stress and face-to-face pressure of the contact portion of the metal gasket. Since a suitable combination can be selected in accordance with various conditions within the range of the ratio R/t described above, a variety of metal gaskets can be produced and stocked by the production department.

Although the metal gasket for a manifold in accordance with the present invention is constituted as described above, the invention is not particularly limited to the above-mentioned construction. For example, the present invention can be applied to a metal gasket for a manifold having the following structure.

Other embodiments of the metal gasket for a manifold in accordance with the present invention will be explained with reference to FIGS. 6, 7 and 8. In the drawings the bead plates are the same as the bead plates 2, 3 of the foregoing embodiment. Therefore, the same reference numeral will be used and the repetition of explanation will be omitted.

Figure 6:
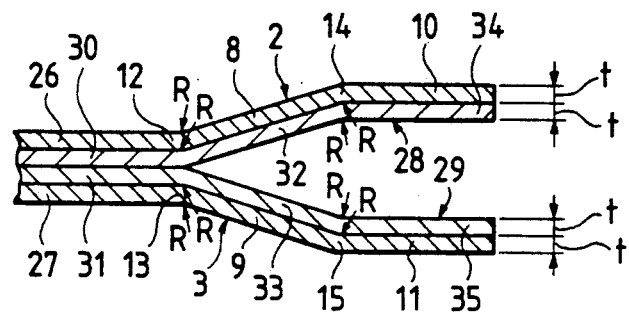
FIG. 6 is a sectional view showing another embodiment of the metal gasket for a manifold in accordance with the present invention and taken along line II—II of FIG. 2.

Referring initially to FIG. 6, this metal gasket for a manifold has two middle plates 28 and 29 composed of a metal thin plate and these middle plates 28, 29 have holes that are bored in positions corresponding to the exhaust ports of the cylinder head, and are disposed between the metal bead plates 2 and 3. One of the middle plates 28 is disposed inside one of the bead plates 2 in such a manner that its entire surface is under the contact state but not under the bonded state and the other middle plate 29 is disposed inside the other bead plate 3 in such a manner that its entire surface is under the contact state but not under the bonded state. In the same way as the middle plates 2, 3, the middle plates 28, 29 have the flat portions 30, 31 which come into contact with the bead plates 2, 3, the taper portions 32, 33 which are bent at the boundary portions with the flat portions 30, 31 and extend in mutually departing directions, and the bead portions 34, 35 which are bent at the boundary portion with the taper portions 32, 33 and extend in parallel with each other. Moreover, the middle plates 28, 29 are shaped so that the ratio R/t of the radius of curvature R of their bent portions to the thickness t of the middle plates 28, 29 is from 7 to 15 in the same way as the bead plates 2, 3.

Figure 7:
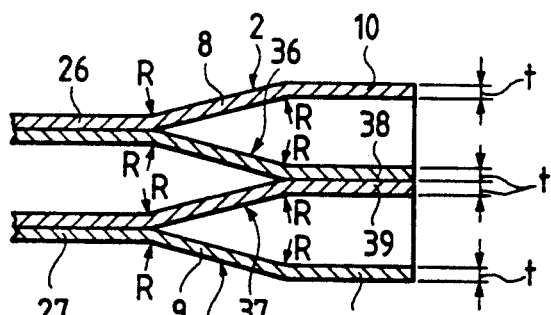
FIG. 7 is a sectional view showing still another embodiment of the metal gasket for a manifold in accordance with the present invention and taken along line II—II of FIG. 2.

Next, this metal gasket for a manifold has two middle plates 36, 37 made of a metal thin plate as shown in FIG. 7 and these middle plates 36, 37 are equipped with bead portions 38, 39 and with holes bored in such a manner as to correspond to the exhaust ports of the cylinder head and are disposed between the metal bead plates 2, 3, in the same way as the bead plates 2, 3. One of the middle plates 36 is disposed inside one of the bead plates 2 so that its entire surface is under the contact state but not under the bonded state, and the bead plates 10, 38 are disposed in the mutually spaced-apart state. The other middle plate 37 is disposed inside the other bead plate 3 so that its entire surface is under the contact state but not under the bonded state and the bead portions 11, 39 are disposed in the mutually spaced-apart state. Moreover, the bead portion 38 of the middle plate 36 and the bead portion 39 of the middle plate 37 are disposed so that their entire surfaces are under the contact state but not under the bonded state. Moreover, the middle plates 36, 37 are shaped so that the ratio R/t of the radius of curvature R of their bent portions to the thickness t of the middle plates 36, 37 is from 7 to 15 in the same way as the bead plate 2.

Figure 8:
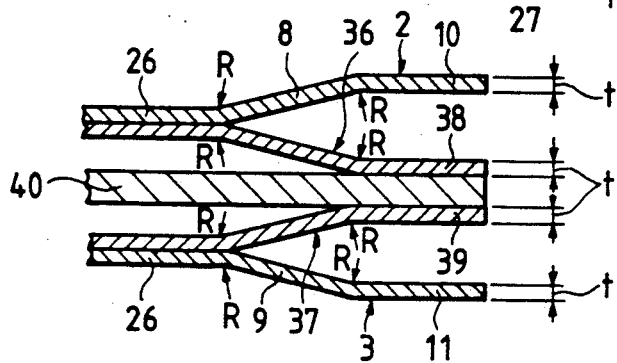
FIG. 8 is a sectional view showing still another embodiment of the metal gasket for a manifold in accordance with the present invention and taken along line II—II of FIG. 2.

Alternatively, the metal gasket for a manifold in this embodiment has three middle plates made of a thin metal plate as shown in FIG. 8. Since the structure of this metal gasket has the same structure as that of the gasket shown in FIG. 7 except for the middle plate 40 disposed at the center, the same reference numerals will be used to identify the same constituents of the middle plates on both sides and the repetition of explanation will be omitted.

What is claimed is:

1. A metal gasket for a manifold disposed between a cylinder head equipped with exhaust ports and an exhaust manifold fixed to said cylinder head and equipped with inlets corresponding to said exhaust ports; comprising:

a plurality of metal bead plates having a plurality of holes formed and positioned in such a manner as to correspond to said exhaust ports of said cylinder head;

said bead plates having flat portions each having a flat surface, taper portions bent at first boundary portions thereof with said flat portions at a predetermined radius of curvature R and extending in a departing direction with respect to the other of said bead plates and bead portions bent at second boundary portions thereof with said taper portions at said predetermined radius of curvature R, extending in parallel and in spaced-apart relation with the other of said bead plates and positioned around said holes formed in said bead plates; and having a ratio R/t of said radius of curvature R to the thickness t of said bead plates being set to within the range of 7 to 15.

2. A metal gasket for a manifold according to claim 1, wherein the thickness of said bead plates ranges from 0.2 to 0.35 mm.

3. A metal gasket for a manifold according to claim 1, wherein said bead plates are produced from a stainless steel sheet.

4. A metal gasket for a manifold disposed between a cylinder head equipped with exhaust ports and an exhaust manifold fixed to said cylinder head and equipped with inlets corresponding to said exhaust ports; comprising:

a pair of metal bead plates having first holes formed and positioned in such a manner as to correspond to said exhaust ports of said cylinder head; and a metal middle plate having second holes formed and positioned in such a manner as to correspond to said exhaust ports of said cylinder head, disposed between said metal bead plates and having a flat surface on each of both sides thereof;

said metal bead plates having flat portions each having a flat surface coming into contact with said metal middle plate, taper portions bent at first boundary portions thereof with said flat portions at a predetermined radius of curvature R and extending in a direction departing from said middle plate and bead portions bent at second boundary portions thereof with said taper portions at said predetermined radius of curvature R, extending in parallel and in spaced-apart relation with said middle plate and positioned around said first holes formed in said bead plates;

having a ratio R/t of said radius of curvature R to the thickness t of said bead plates being set to within the range of 7 to 15.

5. A metal gasket for a manifold according to claim 4, wherein said bead plates and said middle plate are laminated on each other under an unfixed state near said flat portions around said taper portions of said bead plates.

6. A metal gasket for a manifold according to claim 4, wherein said middle plate is produced from an aluminum-plated steel sheet.

7. A metal gasket for a manifold disposed between a cylinder head equipped with exhaust ports and an exhaust manifold fixed to said cylinder head and equipped with inlets corresponding to said exhaust ports; comprising:

a plurality of metal bead plates having first holes formed and positioned in such a manner as to correspond to said exhaust ports of said cylinder head; and a plurality of metal middle plates having second holes formed and positioned in such a manner as to correspond to said exhaust ports of said cylinder head and disposed between said metal bead plates;

said middle plates being laminated on the entire surface of said bead plates under a contact state but not under a bonded state;

of said bead plates and said middle plates having flat portions each having a flat surface, taper portions bent at first boundary portions with said flat portions at a predetermined radius of curvature R and extending in a direction departing from the other of said middle plates and bead portions bent at second boundary portions thereof with said taper portions at said predetermined radius of curvature R, extending in parallel and in spaced-apart relation with the other of said middle plates and positioned around said first holes formed in said bead plates and around said second holes formed in said middle plates;

having a radio R/t of said radius of curvature R to the thickness t of said bead plates being set to within the range of 7 to 15.

8. A metal gasket for a manifold disposed between a cylinder head equipped with exhaust ports and an exhaust manifold fixed to said cylinder head and equipped with inlets corresponding to said exhaust ports; comprising:
- a plurality of metal bead plates having first holes formed and positioned in such a manner as to correspond to said exhaust ports of said cylinder head; and
- a plurality of middle plates having second holes formed and positioned in such a manner as to correspond to said exhaust ports of said cylinder head and disposed between said metal bead plates;
- said metal bead plates having flat portions each having a flat surface coming into contact with a respective metal middle plate, taper portions bent at first boundary portions thereof with said flat portions at a predetermined radius of curvature R and extending in a direction departing from said middle plates and bead portions bent at second boundary portions thereof with said taper portions at said predetermined radius of curvature R, extending in parallel and in spaced-apart relation with said middle plates and positioned around said first holes of said bead plates;
- at least said middle plates on both sides having flat portions each having a flat surface coming into contact with a respective bead plate, taper portions bent at first boundary portions thereof with said flat portions at said radius of curvature R and extending in a departing direction from said bead plates, and bead portions bent at the second boundary portions thereof with said taper portions at said predetermined radius of curvature R, extending in parallel and in spaced-apart relation with said bead plates and positioned around said second holes formed in said middle plates;
- having a ratio R/t of said radius of curvature R to the thickness t of said bead plates being set to within the range of 7 to 15.

* * * * *